United States Patent
Yee et al.

(10) Patent No.: US 8,621,619 B2
(45) Date of Patent: Dec. 31, 2013

(54) DYNAMIC CODE INSERTION FOR STATIC ANALYSIS BASED SANDBOXES

(75) Inventors: Bennet S. Yee, Mountain View, CA (US); David C. Sehr, Cupertino, CA (US); Cliff L. Biffle, Berkeley, CA (US)

(73) Assignee: Google Inc., Mountain View, CA (US)

( * ) Notice: Subject to any disclaimer, the term of this patent is extended or adjusted under 35 U.S.C. 154(b) by 322 days.

(21) Appl. No.: 12/956,860

(22) Filed: Nov. 30, 2010

(65) Prior Publication Data

US 2011/0138473 A1    Jun. 9, 2011

Related U.S. Application Data

(60) Provisional application No. 61/266,500, filed on Dec. 3, 2009.

(51) Int. Cl.
*G06F 21/00* (2006.01)

(52) U.S. Cl.
USPC .............................. 726/22; 726/26; 713/188

(58) Field of Classification Search
USPC .......................................................... 726/22
See application file for complete search history.

(56) References Cited

U.S. PATENT DOCUMENTS

| | | | |
|---|---|---|---|
| 5,454,107 A | 9/1995 | Lehman et al. | |
| 5,974,549 A * | 10/1999 | Golan | 726/23 |
| 6,275,938 B1 * | 8/2001 | Bond et al. | 726/23 |
| 2008/0016339 A1 | 1/2008 | Shukla | |
| 2009/0204768 A1 | 8/2009 | Bruening et al. | |

OTHER PUBLICATIONS

Authorized Officer Sogno-Pabis, Elzbieta, Invitation to Pay Additional Fees and Annex to Form PCT/ISA/206, Communication Relating to the Results of the Partial International Search, mailed Apr. 6, 2011 for International Application No. PCT/US2010/058742, filed Dec. 2, 2010, 3 pages.
Yee, et al., "Native Client: A Sandbox for Portable, Untrusted x86 Native Code," 2009 30th IEEE Symposium on Security and Privacy, IEEE, Piscataway, NJ, USA, May 17, 2009, pp. 79-93.
International Search Report and the Written Opinion for International Application No. PCT/US2010/058742, mailed Jul. 19, 2011, 15 pages.
U.S. Appl. No. 12/621,266, filed Nov. 18, 2009, 49 pages.
U.S. Appl. No. 12/117,634, filed May 8, 2008, 78 pages.
U.S. Appl. No. 12/117,650, filed May 8, 2008, 82 pages.
U.S. Appl. No. 12/621,286, filed Nov. 18, 2009, 52 pages.

\* cited by examiner

*Primary Examiner* — Yogesh Paliwal
(74) *Attorney, Agent, or Firm* — Fish & Richardson P.C.

(57) ABSTRACT

Methods and apparatus for dynamically adding and deleting new code to previously validated application executing in a secured runtime. New code is written to a portion of secured memory not executable by application. New code is validated to ensure it cannot directly call operating system, address memory outside of secured memory, or modify secured memory state. Indirect branch instructions may only target addresses aligned on fixed size boundaries within the secured memory. Validated code is copied to portion of secured memory executable by application in two stage process that ensures partially copied segments cannot be executed. Validated new code can be deleted once all threads reach safe execution point, provided code was previously inserted as unit or contains no internal targets that can be called by code not also being deleted.

32 Claims, 5 Drawing Sheets

DYNAMIC CODE INSERTION FOR STATIC ANALYSIS BASED SANDBOXES

CROSS REFERENCE TO RELATED APPLICATIONS

This application claims the benefit of U.S. Provisional Application No. 61/266,500, filed Dec. 3, 2009, and titled "Dynamic Code Insertion and Removal for Static Analysis Based Sandboxes," which is incorporated herein by reference in its entirety.

TECHNICAL FIELD

This application relates in general, to computer security. More specifically, this application relates to a method and apparatus for dynamically adding and validating untrusted code to previously validated untrusted code, and safely executing the dynamically added and previously validated untrusted code.

BACKGROUND

As an application platform, the modern web browser brings together a remarkable combination of resources, including seamless access to Internet resources, high productivity programming languages such as JavaScript, and the richness of the Document Object Model (DOM) for graphics presentation and user interaction. While these strengths put the browser in the forefront as a target for new application development, browser based applications often remain handicapped in the critical dimension of computational performance when compared to native client applications.

Modern web browsers provide various extension mechanisms such as ACTIVEX and NPAPI plug-ins to allow native code to be loaded and run in a browser as part of a web application. While such architectures allow browser based applications to achieve the performance characteristics of native applications, they do so at expense of allowing the browser based applications to circumvent the security mechanisms otherwise applied to web content. Recent measures such as validating and isolating or "sandboxing" native client code have allowed native code to be run within a browser in a secure and safe fashion. Such methods have been described, for example, in the following applications, all of which are hereby incorporated by reference in their entirety: "Method for Validating an Untrusted Native Code Module," application Ser. No. 12/117,634, filed May 8, 2008; "Method for Safely Executing an Untrusted Native Code Module on a Computing Device," application Ser. No. 12/117,650, filed May 8, 2008; "Native Code Module Security for ARM Instruction Set Architectures," application Ser. No. 12/621,286 filed Nov. 18, 2009, and "Native Code Module Security for 64-bit Instruction Set Architectures, application Ser. No. 12/621,266 filed on Jul. 31, 2009.

The methods and apparatus disclosed in the aforementioned applications, including the disclosed code layout rules and static code analysis, allow arbitrary and untrusted code to be safely run as a browser application by reliably disassembling the code and generating a control flow supergraph. However, once the untrusted code is disassembled and a control flow supergraph is generated, no new code may be added. This prohibits many types of code from being safely sandboxed and run as a browser application. In particular, many current native applications rely on the use of dynamically linked libraries ("DLLs") or just-in-time ("JIT") code generation to provide flexibility and coding efficiency. In addition, many modern programming languages such as GO, JAVA, and JAVASCRIPT employ dynamic code generation for the same reasons. Methods that allow the validation and sandboxing of untrusted code that uses DLLs and JIT code generation can further extend the browser's use as a platform to run native applications.

SUMMARY

Computer implemented methods and apparatus are disclosed for dynamically inserting a new piece of code into a sandboxed application that is written to a secured memory and executed within a secure runtime environment. An instruction to insert the new piece of code into the sandboxed application is received. The new piece of code is written to a portion of the secured memory that cannot be written to or executed by the sandboxed application. It is then validated and copied to a portion of the secured memory that cannot be written to but that can be executed by the sandboxed application.

Features and advantages of the computer implemented method include one or more of the following.

When the validated new piece of code is written to a portion of the secured memory it can be written in fixed sized instruction bundles such that no instructions in the instruction bundles span fixed size boundaries within a portion of the secured memory. The portion of the secured memory to which instruction bundles are written can initially contain one or more fixed sized halt instructions. Validated new code can be written to the secured memory in a two-stage process in which a tail portion of a new instruction bundle is first written to the secured memory followed by a header portion, where the header portion is the size of the halt instruction and the tail portion is the size of the fixed sized instruction bundle less the size of the halt instruction. An instruction to flush changes to the d-cache and i-cache portions of the secured memory can be executed after writing the tail portion and the header portions of the new code instruction bundles.

Validated new code is not permitted to directly call the operating system, modify the state of the secured memory, or directly address a memory location that is outside of the secured memory. Branch instructions in the validated new code must target valid addresses. In particular, indirect or non-statically determinable branch instructions in the sandboxed application must target addresses that are aligned on fixed sized boundaries within the secured memory.

Dynamically added new code can be deleted from the sandboxed application running in the secured memory. An instruction to delete a dynamically added code bundle can be received. The dynamically added code bundle can be safely deleted if it was inserted as a unit into the sandboxed application or if it does not contain an intra-bundle address that is a control flow transfer target of an instruction contained in another dynamically inserted instruction bundle, unless that instruction bundle will also be deleted. If the dynamically added code bundle can be safely deleted, it is deleted after all threads of the sandboxed application reach a secure execution point. After the dynamically added code bundle is safely deleted, all threads are permitted to execute beyond the secure execution point.

DETAILED DESCRIPTION

Figure 1:
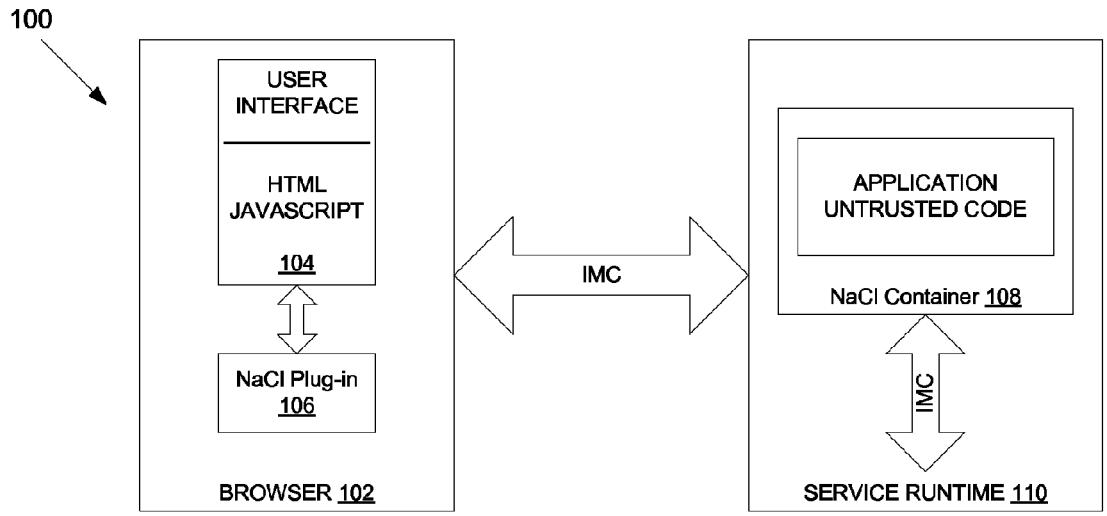
FIG. 1 is a block diagram illustrating a system that can be used to isolate or sandbox untrusted code so that it can be safely run as a browser application.

FIG. 1 is a block diagram illustrating a system 100 that can be used to isolate or sandbox untrusted code so that it can be safely run as a browser application. The system includes a browser 102 that provides a user interface 104 for an application that is written in untrusted code and that can be run in the browser. The user interface 104 can be rendered in browser 102 from untrusted code that is written in HTML or JavaScript or some combination of the two. The browser 102 can be provided with one or more plug-ins such as the Native Client (NaCl) 106 plug-in available from Google, Inc. The browser 102, user interface 104, and NaCl 106 modules can communicate with one another by passing messages through an Inter-Module Communications ("IMC") service. The IMC service can provide a Simple Remote Procedure Call ("SRPC") facility that allows participating modules to use subroutines across module boundaries, and a Netscape Plug-in Application Programming Interface (NPAPI) that allows participating modules to interact with the browser state, including opening Uniform Resource Locaters ("URLs") and accessing the Document Object Model ("DOM") of an HTML document.

When a user navigates to a website containing an application written in untrusted code to be run in browser 102, browser 102 loads and executes the application's JavaScript components, and the NaCl 106 plug-in loads the untrusted code into a NaCl container 108. The NaCl container 108 is an area of secured memory that exists within the address space of a service runtime 110. The service runtime 110 is a trusted application that is native to the user's computer, and that can communicate with the browser 102, user interface 104 and NaCl 106 through the IMC service. The service runtime 110 provides memory management operations, thread creation and destruction, and other system level services for the untrusted application that is loaded into NaCl container 108.

Figure 2:
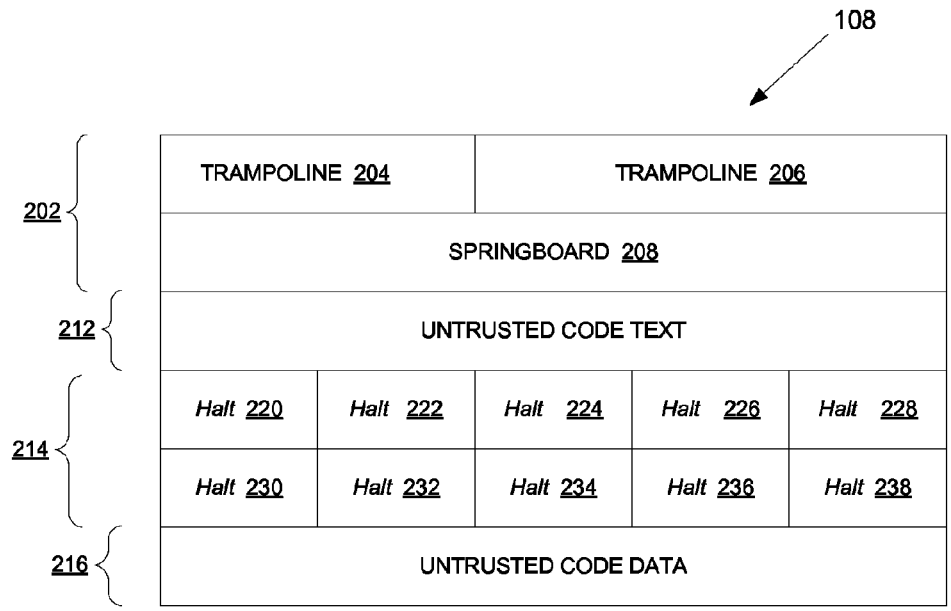
FIG. 2 is a block diagram illustrating one implementation of a Native Client container that can be used to isolate or sandbox untrusted code.

FIG. 2 is a block diagram illustrating one implementation of a Native Client container 108 that can be used to isolate or sandbox untrusted code. When a NaCl container 108 is created, it is created within the address space of the service runtime 110. The service runtime 110 initializes a first or trusted text portion 202 of the address space of the NaCl container 108 with trusted code that can act as "trampolines" or call gates 204 and 206, and that can act as a "springboard" or return gate 208 to the untrusted code. As trusted code, these trampolines 204 and 206 and springboard 208 are not subject to the static analysis, explained below, to which the untrusted code is subjected. The trampolines 204 and 206, and the springboard 208 allow the transfer of data and control between the service runtime 110 and the untrusted code. When the untrusted code wishes to make a system level call or execute an otherwise forbidden instruction, it can attempt to do so by calling a trampoline such as trampoline 204 to the service runtime 110. Upon calling the trampoline, the untrusted code cedes execution control to the service runtime 110, which can decide whether to make the requested system call or perform the otherwise forbidden operation on behalf of the untrusted code. If the requested call is made, or the forbidden operation performed, the service runtime 110 can return none, all, or a portion of the results to the untrusted code by calling a springboard such as springboard 208 to return execution control to the untrusted code. The springboard 208 can also be used by the service runtime 110 to start the main thread or one or more new threads of the application's untrusted code. Springboard 208 may be used for implementations that are run on 32 bit x86 architectures. For other architectures, such as 64-bit x86 or ARM architectures, springboard 208 may be omitted.

In addition to initializing the trusted text portion 202 of the address space of the NaCl container 108, the service runtime 110 can write the untrusted code's ("UC") instructions to a second or UC text portion 212 of the NaCl container 108's address space, and the UC's data to a third or UC data portion 216 or the NaCl container 108's address space. Between the UC text 212 and the UC data 216, the service runtime can include a fourth or dynamic text portion 214 that can be used to dynamically add new code to the untrusted code that is initially loaded in the NaCl container 108. The dynamic text region 214 is a portion of the address space of the NaCl container 108 that the service runtime 110 can use to sandbox or isolate code that is dynamically created by or added to the untrusted application, for example, through the use of just-in-time programming or by linking to a dynamically linked library ("DLL").

When it initializes the trusted text portion 202, UC text portion 212, dynamic text portion 214 and UC data portion 216 of the address space of NaCl container 108 (which is within the service runtime 110's address space), the service runtime 110 does so in a way that all machine code instructions are written so they do not overlap fixed byte boundaries. The machine code instructions existing between any two fixed byte boundaries are dubbed "instruction bundles," and the boundaries themselves are dubbed edges. The service runtime 110 copies machine code to the trusted text portion 202, UC text portion 212, dynamic text portion 214 and UC data portion 216 such that all indirect or non-statically determinable targets of machine code branch instructions (e.g., goto and switch statements) are aligned, i.e., begin on the edge of an instruction bundle. An used herein, an indirect or non-statically determinable target of a machine code branch instruction is a target whose address cannot be determined from data within the machine code instruction itself. By contrast, a statically determinable target of a machine code instruction is a target whose address can be determined from data in the machine code instruction. Writing machine code instructions so that the targets of all indirect branch instructions are aligned on the edge of an instruction bundle may require, padding portions of the machine code instructions with "noop" statements or replacing indirect machine code branch instructions with pseudo-instructions that are designed to target the edge of an instruction bundle. This is more fully explained in U.S. application Ser. No. 12/117,634, filed May 8, 2008, U.S. application Ser. No. 12/117,650 filed May 8, 2008, U.S. application Ser. No. 12/621,266 filed Jul. 31, 2009 and U.S. application Ser. No. 12/621,286 filed Nov. 18, 2009, all of which were previously incorporated by reference. In one implementation, the instruction bundles within the address space of the NaCl container 108 are 32 bytes wide.

Other instruction bundle sizes are possible, however, including but not limited to 16 byte, 64 byte, and 128 byte instruction bundles.

In FIG. 2, a number of instruction bundles 220-238 are shown in the dynamic text portion 214 of the NaCl container 108. While not explicitly shown in FIG. 2, the instruction for trampoline 204 in trusted text portion 202 begins on the edge of a first instruction bundle, while the instruction for trampoline 206 begins on the edge of a third instruction bundle. The untrusted code may not call the springboard 208 (which returns control to the untrusted code), and may only call the trampolines 204 and 206 at the edge of their respective instruction bundles. To ensure security, the untrusted code may not call or address the middle of the instruction bundles for trampolines 204 or 206, or for springboard 208. In one implementation, the first 64 Kbytes of memory in the address space of the NaCl container 108 is not used, and the edge or first byte of the first instruction bundle occurs at byte 64K of NaCl container 108. This implementation is useful for detecting NULL pointer dereference bugs. And, as noted above in 64-bit x86 and ARM architectures, springboard 208 may be present, but is not needed.

When the service runtime 110 creates the UC text portion 212 and the UC data portion 216 of the NaCl container 108, it first analyzes the untrusted code before it allows it to be executed. The analysis that is performed is more fully set forth in U.S. application Ser. No. 12/117,634, filed May 8, 2008, U.S. application Ser. No. 12/117,650 filed May 8, 2008, U.S. application Ser. No. 12/621,266 filed Jul. 31, 2009 and U.S. application Ser. No. 12/621,286 filed Nov. 18, 2009, all of which were previously incorporated by reference. Briefly, the service runtime 110 uses static code analysis to detect security threats in the untrusted code. A set of alignment and structural rules are applied to the data and code that is contained in the trusted text portion 202, UC text portion 212, dynamic text portion 214 and UC data portion 216 of the NaCl container 108 to allow the machine code to be reliably disassembled and analyzed. The alignment and structural rules require that (a) the trusted text portion 202 begins at address 64K in the NaCl container 108 and ends at an address that is an integral multiple of the fixed size instruction bundles, (b) the UC text portion 212 begins immediately after the trusted text portion 202, ends at an address that is an integral multiple of the fixed size instruction bundles, and is not writable once it is loaded, (c) all indirect or non-statically determinable control transfers from the untrusted code use a NaCl jump pseudo-instruction that ensures that the target of the control transfer begins on the edge of an instruction bundle, (d) the machine code is padded up to the nearest page in memory with halt instructions, (e) the untrusted code contains no instructions or pseudo-instructions that straddle the edge of a fixed size instruction bundle (i.e., that are written across two or more instruction bundles), (f) all valid instruction addresses can be reached by a fall-through disassembly beginning with the address of the UC text portion 212, and (g) all direct or statically determinable control transfers target valid instructions. As used herein, a halt instruction is any instruction that will generate a fault and that is no larger than the fixed sized instruction bundles.

With the implementation of these structural and alignment rules, a validator module within the service runtime 110 can check the untrusted code to ensure that (i) no data is directly loaded from or stored outside the sandboxed memory space of the Native Client container 108, (ii) no unsafe instructions are called, and (iii) the control flow for the untrusted code safely targets only valid instruction addresses within the memory space of the Native Client container 108, including the addresses for the service runtime trampolines and springboards (if any), which as explained above, begin on the edges of instruction bundles. The types of unsafe instructions in the untrusted code that are disallowed can include, for example, instructions that directly call the operating system and instructions that could modify the memory state of the NaCl container 108 or the service runtime 110. All indirect or non-statically determinable branch instructions within the untrusted code must be implemented or replaced with pseudo-instructions that ensure that the targets of the branch instructions begin on the edges of a fixed sized instruction bundles. For a given indirect branch instruction, this is achieved by applying a mask to the native code address of the branch instruction, and jumping to the masked address. Further information on the types of unsafe instructions that are disallowed in the untrusted code and on the methods used to mask native code addresses and jump to the masked addresses can be found in U.S. application Ser. No. 12/117,634, filed May 8, 2008, U.S. application Ser. No. 12/117,650 filed May 8, 2008, U.S. application Ser. No. 12/621,266 filed Jul. 31, 2009 and U.S. application Ser. No. 12/621,286 filed Nov. 18, 2009 all of which were previously incorporated by reference.

Figure 3:
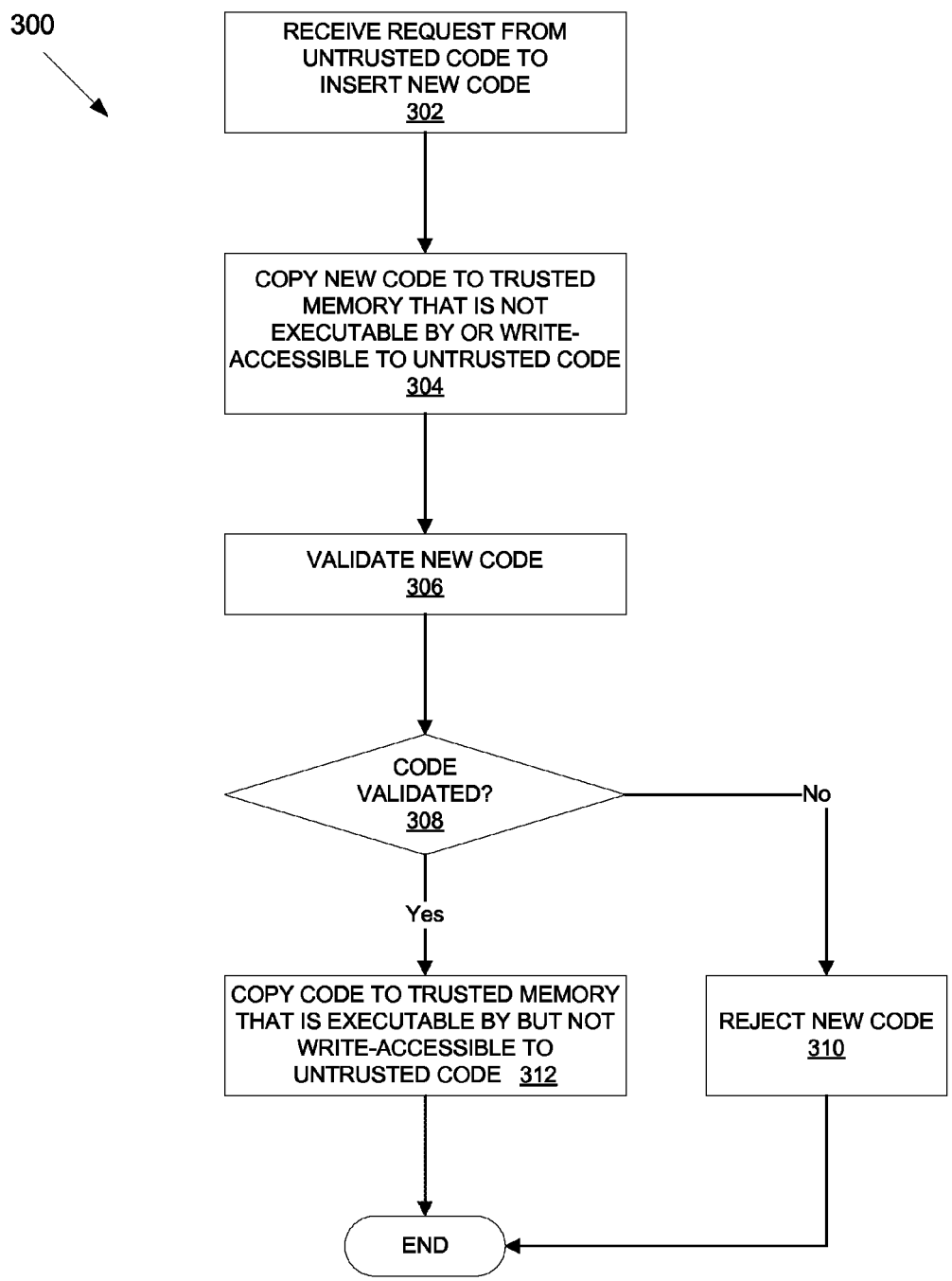
FIG. 3 is a flowchart illustrating a method for dynamically inserting new code into untrusted code that is sandboxed in a Native Client container.

When the service runtime 110 creates and initializes the dynamic text portion 214 of the NaCl container 108, it does so by writing an integer number of fixed sized instruction bundles onto the dynamic text portion 214, such as bundles 220-238 shown in FIG. 2, where each instruction bundle contains one or more halt instructions. As previously noted, a halt instruction is used herein to identify any instruction in any computer architecture that will generate a fault or otherwise reliably cause untrusted code running in the NaCl container 108 to abort should it attempt to interpret and execute data in the dynamic text portion 214 that has not been validated. For example, in x86 implementations, the halt instruction may be an HLT instruction that immediately stops the CPU from executing further instructions. In general, the size of the halt instruction will be less than the size of the instruction bundle, and the instruction bundle will contain a plurality of halt instructions (not shown). The halt instruction is initially written to the dynamic text portion 214 of the NaCl container 108 to prevent the inadvertent interpretation and execution of any data that may be in the dynamic text portion 214. FIG. 3 is a flowchart illustrating a method 300 for dynamically inserting new code into untrusted code that has previously been validated and sandboxed in a Native Client container. As discussed above, many native applications rely on the ability to generate or link to new code during runtime to increase their flexibility or coding efficiency. Examples include applications that rely on dynamically linked libraries (DLLs) and applications that create just-in-time (JIT) code (i.e., code that is generated at runtime, but only if and when it is needed). The method 300 allows such applications to be safely run as browser applications by allowing the new code to be added to the already validated application code that is sandboxed in a Native Client container.

As shown in FIG. 3, when a thread of the previously validated but untrusted application wants to insert new code into the application, it sends a request to the service runtime 110. The service runtime 110 receives the request (302). In one implementation, the request to insert new code is received at a trampoline (e.g., trampoline 204) in the trusted text portion 202 of the NaCl container 108, and includes a pointer to the new code the untrusted application wishes to insert, and an address in the dynamic text portion 214 of the NaCl container 108 where the new code should be inserted. The service runtime 110 retrieves the new code and writes it to an area of memory that is neither executable by nor write-accessible to the untrusted application (304). The area of memory can be, for example, an area that is outside the address space of the NaCl container 108, but within the address space of service runtime 110. This prevents the untrusted application from changing the new code while it is being validated by the service runtime 110.

In one implementation, when writing the new code to the area of memory that is not write-accessible to or executable by the untrusted application, the service runtime 110 applies the same set of alignment and structural rules that were originally applied to the untrusted application code as explained more fully above. These include writing the new code so that no instructions overlap the boundaries of fixed sized instruction bundles, and so that all indirect or non-statically determinable branch instructions target the edge of instruction bundles. This is done to allow the new code to be easily and reliably disassembled and analyzed. In other implementations, the service runtime 110 need not apply these structural and alignment rules when writing the new code to the area of memory that is not write-accessible to or executable by the untrusted application. While the new code can still be validated in these other implementations, it requires the service runtime 110 to validate the code as if it were written in a way that did in fact apply the alignment and structure rules originally applied to the untrusted application code written to the UC text region 210. Once the new code is written to an area of memory that is neither executable by nor write-accessible to the untrusted application (304) the service runtime tries to validate the new code (306). If the validation is not successful (308 "no" branch), the service runtime 110 rejects the new code (310). If the validation is successful (308 "yes" branch), however, the service runtime 110 copies the new code to an area of the dynamic text portion 214 that is executable by but not write accessible to the untrusted application (312). For example, in one implementation the service runtime 110 copies the new code to the address in the dynamic text region 214 that was requested by the untrusted application. The new code is copied into the dynamic text region 214 in a two stage process, explained below in reference to FIG. 4, that ensures that no partially copied code is accessible to or executable by the untrusted application.

The validation process that the service runtime 110 runs on the new code is nearly identical to the validation process (discussed above) that the service runtime 110 performed on the untrusted application code when it was first loaded into the NaCl container 108. The same set of alignment and structural rules are applied to the new code to ensure it can be reliably disassembled as explained above. The same validation rules are also applied, namely, that (i) no data is directly loaded from or stored outside of the address space of the Native Client container 108, (ii) no unsafe instructions as defined above are called, and (iii) the control flow for the new code safely targets only valid instruction addresses within the address space of the Native Client container 108. To ensure the safe targeting of instruction addresses within the Native Client container 108, all indirect or non-statically determinable branch instructions within the new code are replaced with NaCl jump pseudo-instructions. This ensures that the targets of the branch instructions lie on the edges of fixed sized instruction bundles within the address space of the NaCl container 108.

In addition, the validation process allows the new code to make any statically determinable jump or branch to an address that targets the middle of a new code instruction bundle. In one implementation, the validation process prohibits the new code from making a statically determinable jump or branch to an address that targets the middle of an instruction bundle of previously validated code—whether that code was the initial untrusted application code or dynamic code that had previously been validated and added to the initial untrusted application code. In an alternative implementation, the validation process allows the new code to make some statically determinable jumps or branches to addresses that target the middle of an instruction bundle of previously validated code. This is explained more fully below, in reference to FIG. 6.

Figure 4A:
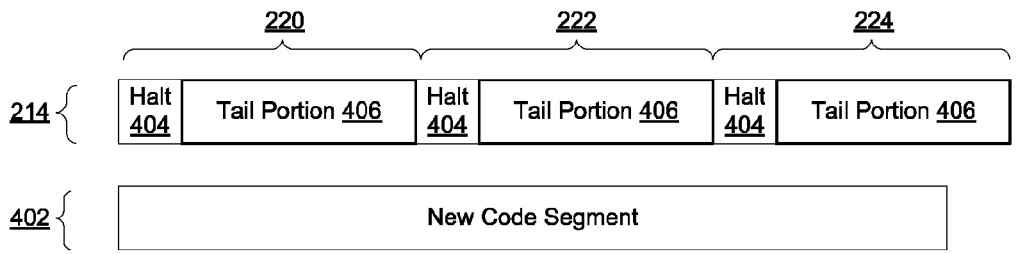
FIGS. 4A-4D are block diagrams illustrating a method of writing new code into dynamic text bundles in a Native Client container.

FIGS. 4A-4D are block diagrams illustrating a method of writing new code into the dynamic text portion 214 of a Native Client container 108. As shown in FIG. 4A, a new code segment 402 to be copied into the dynamic text portion 214 of a Native Client container 108 (not shown), can be of arbitrary size and require one or more fixed sized instruction bundles (e.g., 220-224) within dynamic text portion 214. Each instruction bundle within dynamic text portion 214 is initialized with a plurality of halt commands as explained above. The area within an instruction bundle that is occupied by the first halt command is considered the head 404 of the instruction bundle, and the area that constitutes the remainder of the instruction bundle is considered the tail 406 of the instruction bundle. For example, in x86 architectures, the halt instruction is one byte wide and the head 404 of a 32-byte instruction bundle is 1 byte wide, while the tail 406 is 31 bytes wide. Similarly, in ARM architectures, the halt instruction is 4 bytes wide, and the head 404 of a 32-byte instruction bundle is 4 bytes wide, while the tail 406 is 28 bytes wide. Of course, other implementations are possible. For example, as explained above, the instruction bundle can be 16, 32, 64 or 128 bytes wide. In these implementations, the size of tail portion 406 will be greater or smaller depending on the size of the instruction bundle. Moreover, as seen above, the halt command can have different sizes in different computer architectures, and both the head 404 and tail 406 portions of an instruction bundle can differ in size depending upon the size of the halt instruction.

Figure 4B:
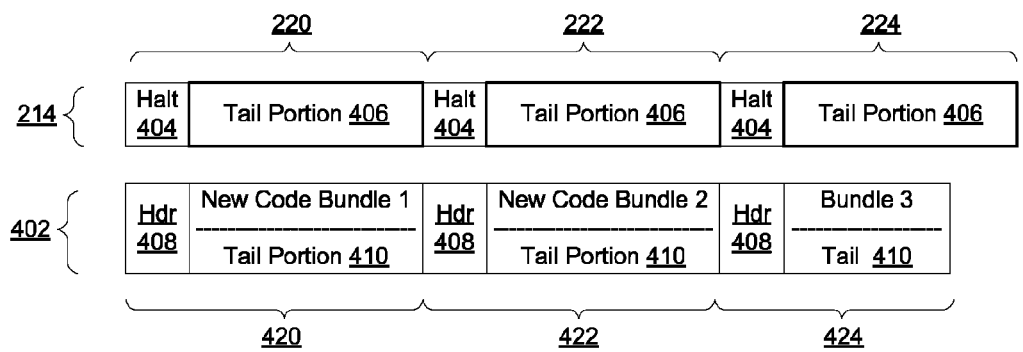

As shown in FIG. 4B, before the service runtime 110 copies the new code segment 402 into the dynamic text portion 214, it first segments the new code segment 402 into a plurality of fixed sized instruction bundles 420-424, each of which corresponds to a respective fixed sized instruction bundle in the dynamic text portion 214 (e.g., instruction bundles 220-224). Further, the service runtime 110 segments each fixed sized instruction bundle 420-424 into a header portion 408 and a tail portion 410, which respectively correspond with the header portion 404 and tail portion 406 of the instruction bundles in dynamic text portion 214.

Figure 4C:
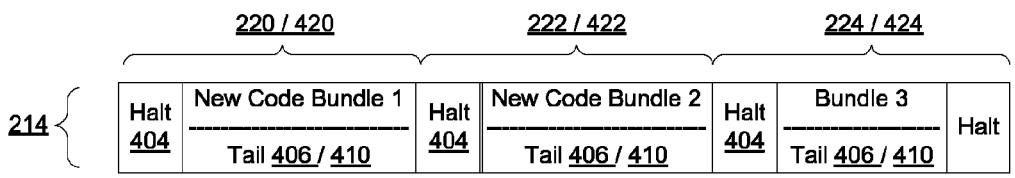

As shown in FIG. 4C, once the service runtime 110 segments the new code segment 402 into a plurality of fixed sized instruction bundles 420-424, each of which is further segmented into a header portion 408 and a tail portion 410, it copies the tail portion 410 of each of the fixed sized instruction bundles 420-424 into the tail portion 406 of the corresponding instruction bundles 220-224 in dynamic text region 214. Each of the instruction bundles 220-224 in the dynamic text region 214 now consist of a header portion 404 that contains a halt instruction, and a tail portion 406 that contains the tail portion 410 of a corresponding fixed sized instruction bundle 420-424 of the new code segment 402. In one implementation, if the last instruction bundle (e.g., instruction bundle 424) of the new code segment 402 is smaller than its corresponding instruction bundle 224 in the dynamic text region 214, either the end of instruction bundle 424 is padded with halt instructions before being copied to instruction bundle 224, or the space remaining in instruction bundle 224 after instruction bundle 424 is copied into it is padded with halt instructions as shown.

Figure 4D:
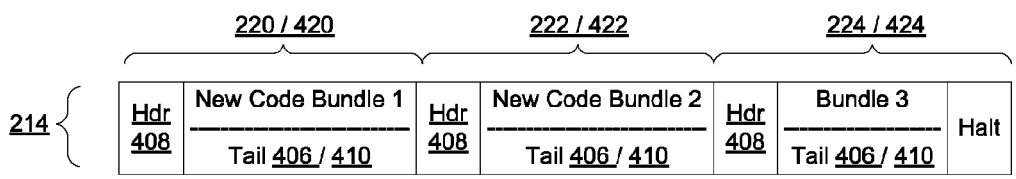

As shown in FIG. 4D, in the second phase of the copy operation, the service runtime 110 copies the header portion 408 of each of the instruction bundles 420-424 of the new code segment 402 into the header portion 404 of the corresponding instruction bundles 220-224 in dynamic text region 214. This overwrites the halt instructions in the header portions 404 of the instruction bundles 220-224 in the dynamic text region 214. At this point, the entire validated new code segment 402 has been copied into the dynamic text region 214, and is available to and becomes part of the sandboxed untrusted application code in the NaCl container 108.

When the service runtime 110 has copied the fixed size instruction bundles 420-424 into the instruction bundles 220-224 in dynamic text region 214, the changes made to the data cache ("d-cache") of the processor that is executing the service runtime 110 are flushed (i.e., written to memory (RAM)). This causes the processor's instruction cache ("i-cache") to be first invalidated and then updated to store the instructions contained in the newly written instruction bundles 420-424. In some implementations, the instructions stored in the i-cache are invalidated via explicit command. In other implementations (employing snoopy caches), the i-cache automatically notices the changes that are made to the d-cache when the service runtime 110 writes the fixed sized instruction bundles 420-424 to the d-cache. In these implementations, the i-cache can invalidate the currently stored instructions, and obtain updated instructions that include the instructions contained in the dynamically generated and validated fixed sized instruction bundles 420-424.

The two-phase copy operation disclosed in FIGS. 4A-4D is performed to prevent a thread of the untrusted application from loading and executing instructions in a partially written instruction bundle from the dynamic text region 214 (e.g., by snooping the d-cache before the entire instruction bundle is written and automatically transferring the snooped changes from d-cache to i-cache). Since all partially written instruction bundles 420-424 begin with a halt command, any thread of the untrusted application that attempts to load and execute an instruction from a partially written instruction bundle will be immediately terminated.

Figure 5:
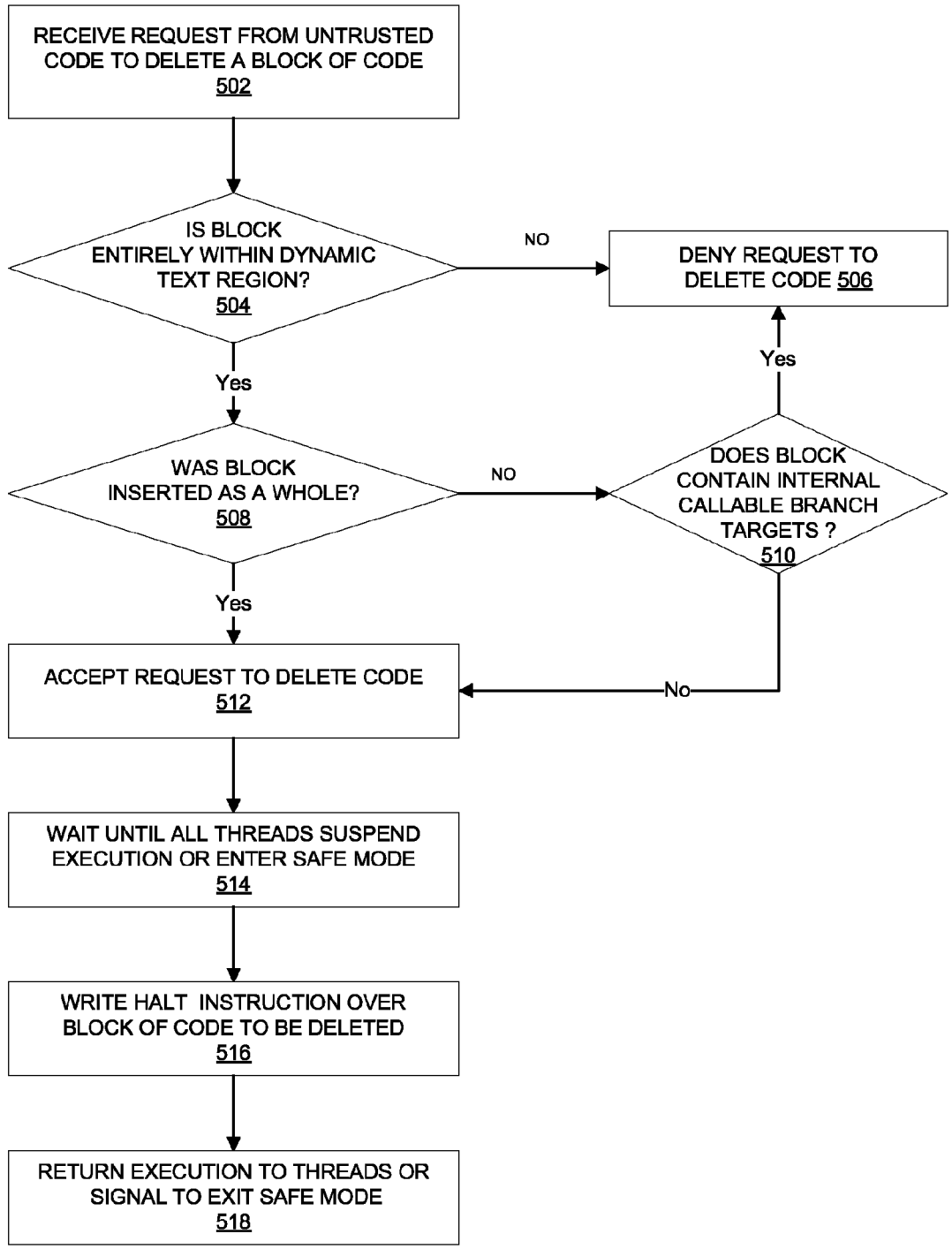
FIG. 5 is a flowchart illustrating a method for dynamically delete code from untrusted code that is sandboxed in a Native Client container.

FIG. 5 is a flowchart illustrating a method for dynamically deleting code from an untrusted application that is sandboxed in a Native Client container. As shown in FIG. 5, when a thread of the untrusted application (which can include untrusted code that has been dynamically added) wants to delete a block of code from the application, it sends a request to the service runtime 110, which receives the request (502). In one implementation, the request to delete a block of code is received at a trampoline (e.g., trampoline 206) in the trusted text portion 202 of the NaCl container 108, and includes a pointer to the address of the block of code to be deleted and the size of the block of code to be deleted. The untrusted application thread that requests the service runtime 110 to delete the block of code also sends messages to all the other application threads to inform them of the code to be deleted. When the other threads receive this message, they suspend execution or enter a safe execution mode. In one implementation, the other threads can suspend their execution by calling a trampoline to the service runtime 110. In other implementations, where certain system calls are permitted, the other threads can suspend their execution simply by making a system call, which suspends their execution and transfers execution control to the operating system. In still other implementations, the other threads can continue to execute code after receiving the deletion message, but can only execute safe instructions (i.e., instructions that do not make any calls to application code that has been dynamically added to the dynamic text portion 214 of the NaCl container 108). In this implementation, the application's threads can set a safe execution flag to indicate they are executing only safe instructions.

When the service runtime 110 receives a request from an application thread to delete a block of code, it checks whether the block of code to be deleted lies entirely within the dynamic text portion 214 of the NaCl container 108 (504). This ensures that only application code that has been dynamically inserted into the NaCl container 108 as explained above can be deleted from the container. If the service runtime 110 determines that some or all of the block of code to be deleted has been loaded to a memory location that is outside of the dynamic text portion 214 of the NaCl container 108, the service runtime 110 denies the request to delete the block of code (506), and returns execution to the application thread that called it. If the service runtime 110 determines that the block of code to be deleted exists entirely within the dynamic text portion 214 of the NaCl container 108 (504), it then determines if the block of code was previously inserted as an atomic unit, i.e., as a whole block of code (508). If the service runtime 110 determines that the block of code was previously inserted as an atomic unit (508), it accepts the request to delete the block of code (512). If, however, the service runtime 110 determines that the block of code was not previously inserted as an atomic unit (508), it determines whether the block of code contains any internal addresses that are targeted (i.e., called) by any untrusted application code that is not also being deleted (510). If it does, the service runtime again denies the request to delete the block of code (506), and returns execution to the application thread that called it. If, however, the service runtime 110 determines that the block of code does not contain any internal addresses that are targeted by untrusted application code that is not also being deleted (510), it accepts the request to delete the block of code (512).

Once the service runtime 110 accepts the request to delete the block of code (512), it waits until all currently executing application threads suspend execution or enter a safe execution mode (514). As used herein, a safe execution mode is an execution mode in which the untrusted code executes a limited set of instructions that do not call or try to execute any of the dynamically added code. This is done to ensure that no currently executing application threads call any of the code that is about to be deleted. In one implementation, application threads can enter safe execution mode by calling a trampoline 204 or 206 to the service runtime 110. In this implementation, the service runtime 110 can determine that all application threads have entered safe execution mode by counting the number of threads that call the trampoline 204 or 206 and comparing that count to the total number of application threads. In another implementation, application threads can enter safe execution mode by setting a safe execution flag and executing a limited set of instructions that do not call any dynamically inserted code. In this implementation, the service runtime 110 can determine that all application threads are in safe execution mode by counting the number of threads that have set the safe execution flag, and comparing that count to the total number of threads.

Once the service runtime 110 determines that all of the executing threads have either suspended execution or entered a safe execution mode, it writes one or more halt instructions over the entire block of code to be deleted (516). It then returns control to the application thread that requested the deletion of the block of code, returns execution control to those application threads that had suspended execution, and signals application threads that had entered safe execution mode that they can exit safe execution mode (518). This can be done, for example, by calling a springboard to those application threads that had suspended their execution by calling a trampoline to the service runtime, or by clearing a safe execution flag that had been set by those application threads that entered a safe execution mode. It should be noted that upon resuming execution or exiting safe execution mode, some of the application threads may call the block of code that has just been deleted. If they do, they will execute the halt instruction that the service runtime 110 wrote over the deleted block of code, causing the CPU to immediately halt execution. Thus, while this method of deletion ensures the safe execution of the untrusted application code, it does not ensure the correct execution of the code.

Figure 6:
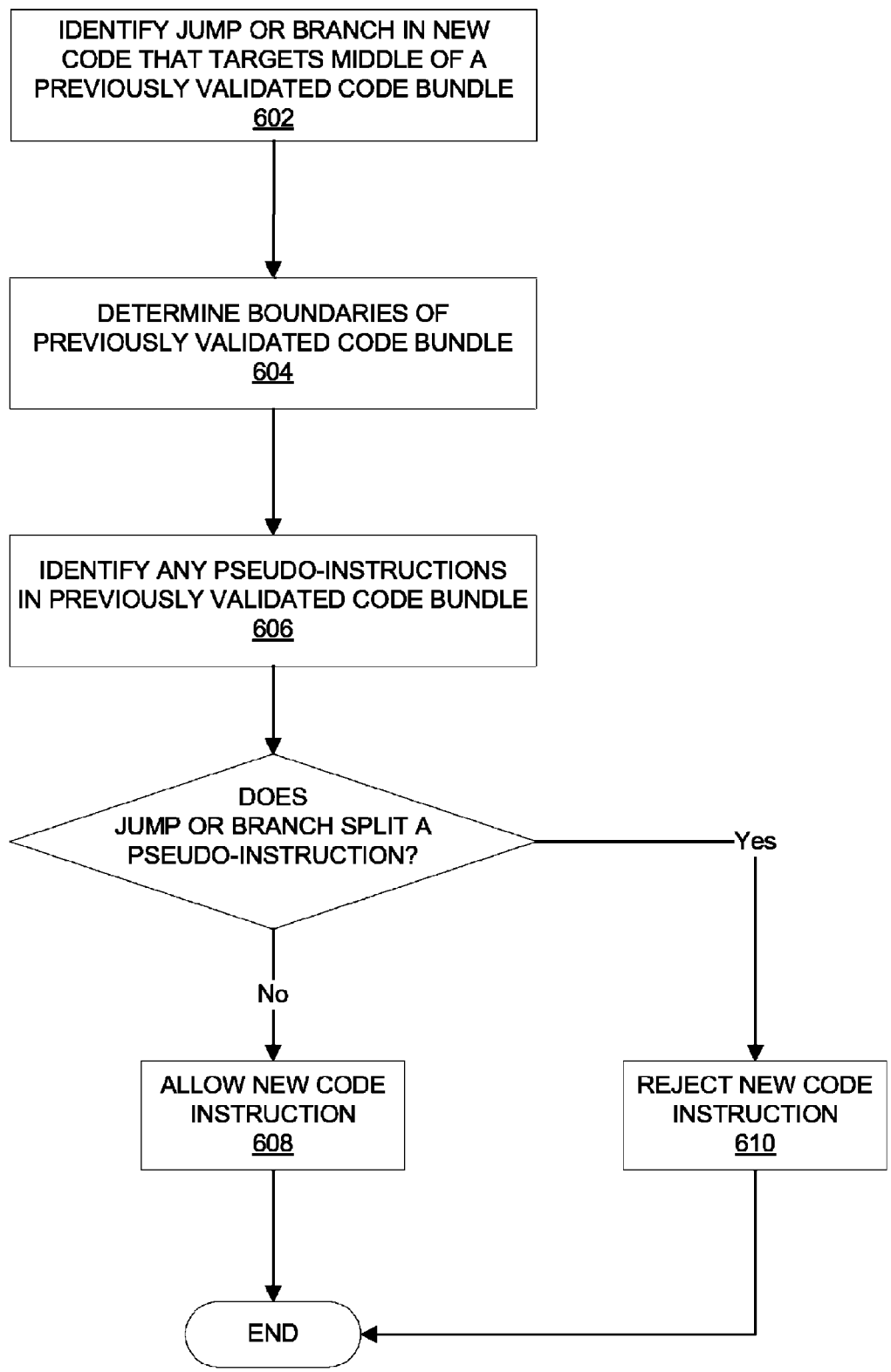
FIG. 6 is a flowchart illustrating a method for determining whether to allow new code to call or branch to a target that lies in the middle of a bundle of previously validated code.

FIG. 6 is a flowchart illustrating a method for determining whether to allow new code to call or branch to a target whose address lies in the middle of a fixed sized instruction bundle of previously validated code. As shown in the figure, in validating new code, the service runtime 110 may determine that the new code is attempting to jump or branch to a target address that does not lie on the edge of an instruction bundle of previously validated code (602). In one implementation, such instructions are not allowed, and the service runtime 110 would reject the new code. In the implementation shown in FIG. 6, however, the service runtime 110 first determines the boundaries of the instruction bundle of previously validated code that contains the jump or branch target (604). The service runtime 110 then runs a subset of the validation algorithm on that instruction bundle to determine whether the instruction bundle contains any NaCl pseudo-instructions (606). Such instructions can include, for example, the NaCl jump instruction described above, which ensures that all jumps or branches target an address on the edge of an instruction bundle. If the instruction bundle does not contain any NaCl pseudo-instructions, or the target address of the jump or branch instruction in the new code does not split any NaCl pseudo-instructions within the instruction bundle, the jump or branch instruction in the new code is allowed (608). If, however, the target address of the jump or branch instruction in the new code splits an NaCl pseudo-instruction within the instruction bundle, the new code is rejected (610), and the service runtime 110 returns control to the thread that called it as explained above.

In the methods and apparatus described above, untrusted new code was permitted to be added to a memory container containing a previously validated but untrusted application by applying certain structural and alignment rules to both the previously validated untrusted application code and the new code to be inserted. This permitted the untrusted application code and new code to be reliably disassembled. In other implementations, the complexity of applying such structural and alignment rules can be avoided by writing the untrusted application and new code to memory pages that are interpreted and understood by the operating system rather than to aligned instruction bundles within the NaCl container 108 that are interpreted and understood by the service runtime 110. In this implementation, the service runtime 110 can write untrusted application code or new code to non-executable memory pages before attempting to validate the code. If the service runtime 110 subsequently validates the code, it can set the execution bits of the memory page to allow the code to be executed, and can map the page to a location within the dynamic text region 214 that is readable and executable by the untrusted code but that cannot be written to by the untrusted code. When code is to be deleted, the service runtime 110 can first wait for all running threads to suspend execution or enter a safe execution mode as explained above, then clear the execution bits of the memory page on which the code is written to safely delete the code and prevent its further execution by the untrusted application. Alternatively, the memory page can be overwritten with halt instructions.

Implementations of the various techniques described herein may be implemented in digital electronic circuitry, or in computer hardware, firmware, software, or in combinations of them. Implementations may implemented as a computer program product, i.e., as a computer program tangibly embodied in a machine-readable storage device for execution by, or to control the operation of, a data processing apparatus, e.g., a programmable processor, a computer, or multiple computers. A computer program, such as the computer program (s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communications network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer may also include, or be operatively coupled to receive data from and/or transfer data to one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method, comprising:
executing a first piece of code of a thread of a sandboxed application that is written to a secured memory, wherein code of the sandboxed application comprises untrusted code that has been previously validated;
receiving, as a result of executing the first piece of code, a request from the thread of the sandboxed application to dynamically insert a new piece of code into the untrusted code of the sandboxed application during runtime; and
in response to receiving the request:
writing the new piece of code to a portion of the secured memory that cannot be executed by the sandboxed application;
validating the new piece of code; and
in response to a successful validation, writing the validated piece of code to a portion of the secured memory that can be executed by the sandboxed application.

2. The method of claim 1, wherein writing the new piece of code to a portion of the secured memory that cannot be executed by the sandboxed application comprises writing the new piece of code such that no instructions are written across fixed size boundaries within the portion of the secured memory that cannot be executed by the sandboxed application.

3. The method of claim 1, wherein writing the validated piece of code to a portion of the secured memory that can be executed by the sandboxed application comprises writing the validated piece of code so that no instructions are written across fixed sized boundaries within the portion of the secured memory that can be executed by the sandboxed application.

4. The method of claim 1, wherein validating the new piece of code comprises determining that none of the instructions in the new piece of code directly calls the operating system.

5. The method of claim 1, wherein validating the new piece of code comprises determining that none of the instructions in the new piece of code can modify the state of the secured memory.

6. The method of claim 1, wherein validating the new piece of code comprises determining that all of the indirect branch instructions in the new piece of code target addresses in the sandboxed application that are aligned on fixed size boundaries within the portion of the secured memory that cannot be executed by the sandboxed application.

7. The method of claim 1, wherein writing the validated piece of code to the portion of the secured memory that can be executed by the sandboxed application comprises writing the validated piece of code so that an indirect branch instruction in the validated piece of code targets an address in the sandboxed application that is aligned on a fixed size boundary within the portion of the secured memory that can be executed by the sandboxed application.

8. The method of claim 1, wherein validating the new piece of code comprises determining that none of the instructions in the new piece of code directly address a memory location that is outside the location of the secured memory.

9. The method of claim 1, wherein the portion of the secured memory that can be executed by the sandboxed application is delineated in fixed sized instruction bundles, and each instruction bundle is initially filled with a plurality of halt instructions.

10. The method of claim 9, wherein writing the validated piece of code to the portion of the secured memory that can be executed by the sandboxed application, comprises:
segmenting the new piece of code into one or more units, each unit corresponding to a memory bundle in the secured memory and having a header portion and a tail portion, wherein the size of the header portion is the size of a halt instruction and the size of the tail portion is the size of a memory bundle less the size of the halt instruction;
writing the tail portion of each unit into its corresponding memory bundle in the portion of the secured memory that can be executed by the sandboxed application; and
writing the header portion of each unit into its corresponding memory bundle in the portion of the secured memory that can be executed by the sandboxed application.

11. The method of claim 10, further comprising: executing an instruction to flush changes to a d-cache portion of the secured memory and to flush changes to an i-cache portion of the secured memory after writing the tail portion of each unit into its corresponding memory bundle.

12. The method of claim 10, further comprising: executing an instruction to flush changes to a d-cache portion of the secured memory and to flush changes to an i-cache portion of the secured memory after writing the header portion of each unit into its corresponding memory bundle.

13. A computer system, comprising a processor coupled to a memory, wherein the memory stores instructions to cause the processor to:
execute a first piece of code of a thread of a sandboxed application that is written to a secured memory, wherein code of the sandboxed application comprises untrusted code that has been previously validated;
receive, as a result of executing the first piece of code, an instruction request from the thread of the sandboxed application to dynamically insert a new piece of code into the untrusted code of the sandboxed application during runtime;
write the new piece of code to a first secure portion of the memory that cannot be executed by the sandboxed application;
validate the new piece of code; and
in response to a successful validation, copy the validated piece of code to a second secure portion of the memory that can be executed by the sandboxed application.

14. The computer system of claim 13, wherein the instruction stored in memory to cause the processor to write the new piece of code to the first secure portion of the memory comprises an instruction to write the new piece of code such that no instructions are written across fixed size boundaries within the first secure portion of the memory.

15. The computer system of claim 13, wherein the instruction stored in memory to cause the processor to copy the validated piece of code to the second secure portion of the memory comprises an instruction to copy the validated piece of code so that no instructions are written across fixed sized boundaries within the second secure portion of the memory.

16. The computer system of claim 13, wherein the instruction stored in memory to cause the processor to validate the new piece of code comprises an instruction to determine that none of the instructions in the new piece of code directly calls the operating system.

17. The computer system of claim 13, wherein the instruction stored in memory to cause the processor to validate the new piece of code comprises an instruction to determine that none of the instructions in the new piece of code can modify the state of the second secured portion of the memory.

18. The computer system of claim 13, wherein the instruction stored in memory to cause the processor to validate the new piece of code comprises an instruction to determine that all of the indirect branch instructions in the new piece of code target addresses in the sandboxed application that are aligned on fixed size boundaries within the first secure portion of the memory.

19. The computer system of claim 13, wherein the instruction stored in memory to cause the processor to copy the validated piece of code to the portion of the memory that can be executed by the sandboxed application comprises instructions to copy the validated piece of code so that all of the indirect branch instructions in the validated piece of code target addresses in the sandboxed application that are aligned on fixed size boundaries within the second secure portion of the memory.

20. The computer system of claim 13, wherein the instruction stored in memory to cause the processor to validate the new piece of code comprises an instruction to determine that none of the instructions in the new piece of code directly address a memory location that is outside the location of the second secure portion of the memory.

21. The computer system of claim 13, wherein the second portion of the memory is delineated in fixed sized instruction bundles, and each instruction bundle is initially filled with a plurality of halt instructions.

22. The computer system of claim 21, wherein the instruction to copy the validated piece of code to the second secure portion of the memory comprises instructions to:
   segment the validated piece of code into one or more units, each unit corresponding to an instruction bundle in the second secure portion of the memory and having a header portion and a tail portion, wherein the size of the header portion is the size of a halt instruction and the size of the tail portion is the size of an instruction bundle less the size of the halt instruction;
   write the tail portion of each unit into its corresponding instruction bundle in the second secure portion of the memory; and
   write the header portion of each unit into its corresponding instruction bundle in the second secure portion of the memory.

23. A computer program product, tangibly embodied in a non-transitory computer-readable medium, comprising instructions operable to cause a programmable processor to:
   execute a first piece of code of a thread of a sandboxed application that is written to a secured memory, wherein code of the sandboxed application comprises untrusted code that has been previously validated;
   receive, as a result of executing the first piece of code, an instruction request from the thread of the sandboxed application to dynamically insert a new piece of code into the untrusted code of the sandboxed application during runtime;
   write the new piece of code to a first portion of a secured memory that cannot be executed by the sandboxed application;
   validate the new piece of code; and
   in response to a successful validation, copy the validated piece of code to a second portion of the secured memory that can be executed by the sandboxed application.

24. The computer program product of claim 23, wherein the instruction to write the new piece of code to the first portion of the secured memory comprises an instruction to write the new piece of code such that no instructions are written across fixed size boundaries within the first portion of the secured memory.

25. The computer program product of claim 23, wherein the instruction to copy the validated piece of code to the second portion of the secured memory comprises an instruction to copy the validated piece of code so that no instructions are written across fixed sized boundaries within the second portion of the secured memory.

26. The computer program product of claim 23, wherein the instruction to validate the new piece of code comprises an instruction to determine that none of the instructions in the new piece of code directly calls the operating system.

27. The computer program product of claim 23, wherein the instruction to validate the new piece of code comprises an instruction to determine that none of the instructions in the new piece of code can modify the state of the secured memory.

28. The computer program product of claim 23, wherein the instruction to validate the new piece of code comprises an instruction to determine that all of the indirect branch instructions in the new piece of code target addresses in the sandboxed application that are aligned on fixed size boundaries within the first portion of the secured memory.

29. The computer program product of claim 23, wherein the instruction to copy the validated piece of code to the second portion of the secured memory instructions to copy the validated piece of code so that all of the indirect branch instructions in the validated piece of code target addresses in the sandboxed application that are aligned on fixed size boundaries within the second portion of the secured memory.

30. The computer program product of claim 23, wherein the instruction to validate the new piece of code comprises an instruction to determine that none of the instructions in the new piece of code directly address a memory location that is outside the location of the secured memory.

31. The computer program product of claim 23, wherein the second portion of the secured memory is delineated in fixed sized instruction bundles, and each instruction bundle is initially filled with a plurality of halt instructions.

32. The computer program product of claim 31, wherein the instruction to copy the validated piece of code to the second portion of the secured memory, comprises instructions to:
   segment the validated piece of code into one or more units, each unit corresponding to an instruction bundle in the second portion of the secured memory and having a header portion and a tail portion, wherein the size of the header portion is the size of a halt instruction and the size of the tail portion is the size of an instruction bundle less the size of the halt instruction;
   write the tail portion of each unit into its corresponding instruction bundle in the second portion of the secured memory; and write the header portion of each unit into its corresponding instruction bundle in the second portion of the secured memory.

* * * * *